US012014673B2

(12) United States Patent
Hussell

(10) Patent No.: US 12,014,673 B2
(45) Date of Patent: Jun. 18, 2024

(54) LIGHT-EMITTING DIODES WITH MIXED CLOCK DOMAIN SIGNALING

(71) Applicant: CreeLED, Inc., Durham, NC (US)

(72) Inventor: Christopher P. Hussell, Raleigh, NC (US)

(73) Assignee: CreeLED, Inc., Durham, NC (US)

( * ) Notice: Subject to any disclaimer, the term of this patent is extended or adjusted under 35 U.S.C. 154(b) by 0 days.

(21) Appl. No.: 18/065,397

(22) Filed: Dec. 13, 2022

(65) Prior Publication Data

US 2023/0252934 A1 Aug. 10, 2023

Related U.S. Application Data

(60) Provisional application No. 63/307,423, filed on Feb. 7, 2022.

(51) Int. Cl.
*G09G 3/32* (2016.01)

(52) U.S. Cl.
CPC .......... *G09G 3/32* (2013.01); *G09G 2310/08* (2013.01); *G09G 2360/12* (2013.01)

(58) Field of Classification Search
CPC ... G09G 3/32; G09G 2310/08; G09G 2360/12
See application file for complete search history.

(56) References Cited

U.S. PATENT DOCUMENTS 5,359,345 A 10/1994 Hunter
6,016,038 A 1/2000 Mueller et al.
(Continued)

FOREIGN PATENT DOCUMENTS

CN 1965340 A 5/2007
CN 101926222 A 12/2010
(Continued)

OTHER PUBLICATIONS

Author Unknown, "APA102-2020 Super LED," Datasheet, Shenzhen LED Color Opto Electronic Co., Ltd., retrieved Apr. 10, 2019 from http://www.led-color.com/upload/201604/APA102-2020%20SMD%20LED.pdf, 6 pages.
(Continued)

*Primary Examiner* — Muhammad N Edun
(74) *Attorney, Agent, or Firm* — Withrow & Terranova, P.L.L.C.

(57) ABSTRACT

Mixed clock domain signaling and, more particularly, mixed clock domain signaling for light-emitting diode (LED) packages arranged for cascade communication is disclosed. Mixed clock domain signaling involves digital communication where time-positions of bit pulse edges in a communication channel are derived from multiple uncorrelated clock domains, including an original clock domain from a master controller and a local clock domain. In the context of LED displays, serial strings of LED packages are arranged as LED pixels to receive cascade communication signals, and the original clock domain is derived from a master controller and a local clock domain is derived at each LED package. By providing for the bit period to be maintained and correlated to the original clock domain throughout the repeated cascade communication, problems associated with multiple uncorrelated clock domains in the communication channel, such as sampling jitter, may be averted, thus avoiding loss of data integrity.

25 Claims, 5 Drawing Sheets

(56) References Cited

U.S. PATENT DOCUMENTS

| | | | |
|---|---|---|---|
| 6,150,774 | A | 11/2000 | Mueller et al. |
| 6,166,496 | A | 12/2000 | Lys et al. |
| 6,211,626 | B1 | 4/2001 | Lys et al. |
| 6,292,901 | B1 | 9/2001 | Lys et al. |
| 6,538,626 | B1 | 3/2003 | Nieberger et al. |
| 7,206,001 | B1 | 4/2007 | Crandall et al. |
| 7,579,629 | B2 | 8/2009 | Inoguchi |
| 8,111,001 | B2 | 2/2012 | Underwood et al. |
| 8,328,405 | B2 | 12/2012 | Negley |
| 8,922,458 | B2 | 12/2014 | Sefton et al. |
| 8,937,492 | B1 | 1/2015 | Gideon |
| 8,970,131 | B2 | 3/2015 | Brandes et al. |
| 9,414,454 | B2 | 8/2016 | Brandes et al. |
| 9,717,123 | B1 | 7/2017 | Yao |
| 10,368,411 | B2 | 7/2019 | Zhang et al. |
| 10,384,239 | B2 | 8/2019 | Fedigan et al. |
| 10,453,827 | B1 | 10/2019 | Hussell et al. |
| 10,663,418 | B2 | 5/2020 | Magee et al. |
| 10,682,675 | B2 | 6/2020 | Magee et al. |
| 10,695,805 | B2 | 6/2020 | Magee et al. |
| 10,908,414 | B2 | 2/2021 | Revier et al. |
| 2001/0028356 | A1 | 10/2001 | Balogh |
| 2002/0130627 | A1 | 9/2002 | Morgan et al. |
| 2003/0058885 | A1 | 3/2003 | Sorenson et al. |
| 2004/0160199 | A1 | 8/2004 | Morgan et al. |
| 2004/0246278 | A1 | 12/2004 | Elliott |
| 2006/0022214 | A1 | 2/2006 | Morgan et al. |
| 2006/0114269 | A1 | 6/2006 | Chang-Ho et al. |
| 2006/0168496 | A1 | 7/2006 | Steele et al. |
| 2007/0097055 | A1 | 5/2007 | Takamura et al. |
| 2007/0195025 | A1 | 8/2007 | Korcharz et al. |
| 2007/0231846 | A1 | 10/2007 | Cosentino et al. |
| 2007/0237165 | A1 | 10/2007 | Chiang |
| 2007/0296464 | A1 | 12/2007 | Lewko |
| 2008/0018261 | A1 | 1/2008 | Kastner |
| 2008/0062158 | A1 | 3/2008 | Willis |
| 2008/0136844 | A1 | 6/2008 | Takada et al. |
| 2008/0245949 | A1 | 10/2008 | Morimoto et al. |
| 2009/0066526 | A1 | 3/2009 | Marshall et al. |
| 2009/0079362 | A1 | 3/2009 | Shteynberg et al. |
| 2009/0109168 | A1 | 4/2009 | Lee et al. |
| 2009/0147028 | A1 | 6/2009 | Sefton et al. |
| 2009/0164713 | A1 | 6/2009 | Tsai et al. |
| 2009/0179843 | A1 | 7/2009 | Ackerman et al. |
| 2009/0201274 | A1 | 8/2009 | Kuwabara et al. |
| 2009/0230885 | A1 | 9/2009 | Tanaka |
| 2009/0278034 | A1 | 11/2009 | Ackermann et al. |
| 2010/0026208 | A1 | 2/2010 | Shteynberg et al. |
| 2010/0085295 | A1 | 4/2010 | Zhao et al. |
| 2010/0102734 | A1 | 4/2010 | Quick et al. |
| 2010/0156952 | A1 | 6/2010 | Arai |
| 2010/0214764 | A1 | 8/2010 | Chaves et al. |
| 2011/0057302 | A1 | 3/2011 | Spehar et al. |
| 2012/0056864 | A1 | 3/2012 | Aioanei |
| 2012/0126711 | A1 | 5/2012 | Suminoe et al. |
| 2012/0147567 | A1 | 6/2012 | Lee et al. |
| 2012/0218754 | A1 | 8/2012 | Maes |
| 2012/0286674 | A1 | 11/2012 | Takanashi |
| 2012/0299480 | A1 | 11/2012 | Peting et al. |
| 2012/0306942 | A1 | 12/2012 | Fujiwara et al. |
| 2013/0057763 | A1 | 3/2013 | Cha et al. |
| 2013/0076250 | A1 | 3/2013 | Logiudice |
| 2013/0114021 | A1 | 5/2013 | Illyama et al. |
| 2013/0169172 | A1 | 7/2013 | Kesterson et al. |
| 2013/0228672 | A1* | 9/2013 | Jung ................. H01L 27/14643 365/194 |
| 2014/0028776 | A1* | 1/2014 | Kawamura .......... G03G 15/043 347/249 |
| 2014/0128941 | A1 | 5/2014 | Williams |
| 2014/0152902 | A1 | 6/2014 | Morrisseau |
| 2014/0265919 | A1 | 9/2014 | Pope et al. |
| 2014/0306966 | A1 | 10/2014 | Kuo et al. |
| 2015/0276144 | A1 | 10/2015 | Tudhope et al. |
| 2015/0319814 | A1 | 11/2015 | Grotsch et al. |
| 2015/0348496 | A1 | 12/2015 | Santos, II et al. |
| 2015/0377695 | A1 | 12/2015 | Chang et al. |
| 2016/0071467 | A1 | 3/2016 | Elder et al. |
| 2016/0161326 | A1 | 6/2016 | Chang et al. |
| 2016/0189605 | A1* | 6/2016 | Ahn ..................... G09G 3/3233 345/76 |
| 2016/0217762 | A1 | 7/2016 | Moon et al. |
| 2016/0293811 | A1 | 10/2016 | Hussell et al. |
| 2016/0314730 | A1 | 10/2016 | Sampsell |
| 2017/0092198 | A1 | 3/2017 | Ryu et al. |
| 2017/0168212 | A1 | 6/2017 | Chen et al. |
| 2017/0263828 | A1 | 9/2017 | Mao et al. |
| 2017/0294495 | A1 | 10/2017 | Shyu et al. |
| 2017/0330509 | A1 | 11/2017 | Cok et al. |
| 2017/0330856 | A1 | 11/2017 | Zou et al. |
| 2018/0033768 | A1 | 2/2018 | Kumar et al. |
| 2018/0035018 | A1 | 2/2018 | Yamada et al. |
| 2018/0076368 | A1 | 3/2018 | Hussell |
| 2018/0114800 | A1 | 4/2018 | Pan |
| 2018/0130441 | A1 | 5/2018 | Jeon |
| 2018/0182927 | A1 | 6/2018 | Vampola et al. |
| 2018/0247608 | A1 | 8/2018 | Chen |
| 2018/0261149 | A1 | 9/2018 | Lin |
| 2018/0348959 | A1 | 12/2018 | Lin et al. |
| 2019/0132921 | A1 | 5/2019 | Rumer |
| 2019/0132923 | A1 | 5/2019 | Rumer |
| 2019/0149792 | A1 | 5/2019 | Luo et al. |
| 2019/0302917 | A1 | 10/2019 | Pan |
| 2019/0335081 | A1 | 10/2019 | Baar et al. |
| 2019/0371974 | A1 | 12/2019 | Hussell |
| 2020/0105179 | A1 | 4/2020 | Greenebaum et al. |
| 2020/0105221 | A1 | 4/2020 | Marcu et al. |
| 2020/0135093 | A1 | 4/2020 | Prathaban et al. |
| 2020/0184900 | A1 | 6/2020 | Shin et al. |
| 2020/0203319 | A1 | 6/2020 | Lee et al. |
| 2020/0251050 | A1 | 8/2020 | Yee |
| 2020/0309357 | A1 | 10/2020 | Hussell et al. |
| 2020/0312220 | A1 | 10/2020 | Hussell et al. |
| 2020/0312222 | A1 | 10/2020 | Hussell |
| 2020/0312225 | A1 | 10/2020 | Hussell |
| 2020/0312226 | A1 | 10/2020 | Hussell |
| 2020/0312231 | A1 | 10/2020 | Hussell |
| 2020/0335042 | A1 | 10/2020 | Son et al. |
| 2021/0005761 | A1 | 1/2021 | Tsai et al. |
| 2021/0399183 | A1 | 12/2021 | Hussell et al. |
| 2022/0044643 | A1* | 2/2022 | Gu ........................... G09G 3/32 |
| 2022/0198989 | A1* | 6/2022 | Park ....................... G09G 5/008 |

FOREIGN PATENT DOCUMENTS

| | | | |
|---|---|---|---|
| CN | 102483897 | A | 5/2012 |
| CN | 207852672 | U | 9/2018 |
| CN | 110782828 | A | 2/2020 |
| EP | 1306827 | B1 | 5/2003 |
| EP | 2400682 | A1 | 12/2011 |
| JP | 2002229502 | A | 8/2002 |
| JP | 2010091825 | A | 4/2010 |
| JP | 201773411 | A | 4/2017 |
| WO | 2005048231 | A1 | 5/2005 |
| WO | 2020030993 | A1 | 2/2020 |
| WO | 2021183299 | A1 | 9/2021 |

OTHER PUBLICATIONS

Author Unknown, “APA102C: RGB Full Color LED control IC,” iPixel LED, Shiji Lighting, retrieved Apr. 10, 2019 from https://cdn-shop.adafruit.com/datasheets/APA102.pdf, 5 pages.

Author Unknown, “Self-clocking signal,” Jul. 1, 2018, Wikipedia, https://en.wikipedia.org/w/index.php?title=Self-clocking_signal&oldid=848405107, 3 pages.

Author Unknown, “Serial communication,” May 2, 2019, Wikipedia, https://en.wikipedia.org/w/index.php?title=Serial_communication&oldid=895110130, 4 pages.

Author Unknown, “SK6812 Technical Data Sheet,” Shenzhen LED Color Optoelectronic Co., Ltd., retrieved Apr. 10, 2019 from https://cdn-shop.adafruit.com/product-files/1138/SK6812+LED+datasheet+.pdf, 8 pages.

(56) References Cited

OTHER PUBLICATIONS

Author Unknown, "SK6812RGBW Specification: Integrated Light Source Intelligent Control of Chip-on-Top SMD Type LED," Jul. 31, 2015, Dongguang Opsco Optpelectronics Co., Ltd., 16 pages.
Author Unknown, "WS2811: Signal line 256 Gray level 3 channal Constant current LED drive IC," Worldsemi, retrieved May 23, 2019 from https://cdn-shop.adafruit.com/datasheets/WS2811.pdf, 7 pages.
Author Unknown, "WS2812: Intelligent control LED integrated light source," Worldsemi, retrieved Apr. 10, 2019 from https://cdn-shop.adafruit.com/datasheets/WS2811.pdf, 5 pages.
Zhu, K., "EC20-6812 Specification: Embedded Control LED," Dec. 19, 2018, Shenzhen Normand Electronic Co., Ltd., 35 pages.
Invitation to Pay Additional Fees and Partial Search for International Patent Application No. PCT/US2020/023140, dated Jun. 16, 2020, 25 pages.
International Search Report and Written Opinion for International Patent Application No. PCT/US2020/023140, dated Aug. 11, 2020, 27 pages.
Non-Final Office Action for U.S. Appl. No. 16/369,003, dated Aug. 21, 2020, 15 pages.
Non-Final Office Action for U.S. Appl. No. 16/381,116, dated Aug. 21, 2020, 8 pages.
Non-Final Office Action for U.S. Appl. No. 16/437,878, dated Aug. 21, 2020, 14 pages.
Non-Final Office Action for U.S. Appl. No. 16/542,923, dated Aug. 21, 2020, 15 pages.
Reason for Rejection for Japanese Patent Application No. 2021-560354, dated Oct. 11, 2022, 7 pages.
Invitation to Pay Additional Fees and Partial Search for International Patent Application No. PCT/US2021/019708, dated May 25, 2021, 17 pages.
International Search Report and Written Opinion for International Patent Application No. PCT/US2021/019708, dated Jul. 19, 2021, 23 pages.
Final Office Action for U.S. Appl. No. 16/369,003, dated Dec. 9, 2020, 17 pages.
Advisory Action for U.S. Appl. No. 16/369,003, dated Feb. 11, 2021, 3 pages.
Non-Final Office Action for U.S. Appl. No. 16/369,003, dated Apr. 1, 2021, 18 pages.
Final Office Action for U.S. Appl. No. 16/369,003, dated Jul. 22, 2021, 16 pages.
Advisory Action for U.S. Appl. No. 16/369,003, dated Sep. 23, 2021, 3 pages.
Non-Final Office Action for U.S. Appl. No. 16/369,003, dated Nov. 12, 2021, 19 pages.
Final Office Action for U.S. Appl. No. 16/369,003, dated Mar. 31, 2022, 23 pages.
Non-Final Office Action for U.S. Appl. No. 16/369,003, dated Jul. 21, 2022, 29 pages.
Final Office Action for U.S. Appl. No. 16/369,003, dated Nov. 1, 2022, 23 pages.
Final Office Action for U.S. Appl. No. 16/369,003, dated Nov. 3, 2022, 24 pages.
Final Office Action for U.S. Appl. No. 16/369,003, dated Dec. 12, 2022, 24 pages.
Final Office Action for U.S. Appl. No. 16/381,116, dated Dec. 10, 2020, 10 pages.
Advisory Action for U.S. Appl. No. 16/381,116, dated Feb. 11, 2021, 3 pages.
Non-Final Office Action for U.S. Appl. No. 16/381,116, dated Apr. 1, 2021, 12 pages.
Final Office Action for U.S. Appl. No. 16/381,116, dated Jul. 22, 2021, 9 pages.
Non-Final Office Action for U.S. Appl. No. 16/381,116, dated Nov. 12, 2021, 10 pages.
Final Office Action for U.S. Appl. No. 16/381,116, dated Mar. 2, 2022, 17 pages.
Advisory Action and Examiner-Initiated Interview Summary for U.S. Appl. No. 16/381,116, dated May 6, 2022, 4 pages.
Non-Final Office Action for U.S. Appl. No. 16/381,116, dated Jun. 22, 2022, 17 pages.
Final Office Action for U.S. Appl. No. 16/381,116, dated Oct. 4, 2022, 17 pages.
Final Office Action for U.S. Appl. No. 16/437,878, dated Dec. 9, 2020, 14 pages.
Advisory Action and Examiner-Initiated Interview Summary for U.S. Appl. No. 16/437,878, dated Feb. 11, 2021, 4 pages.
Non-Final Office Action for U.S. Appl. No. 16/437,878, dated Apr. 1, 2021, 16 pages.
Non-Final Office Action for U.S. Appl. No. 16/437,878, dated Apr. 23, 2021, 17 pages.
Final Office Action for U.S. Appl. No. 16/437,878, dated Sep. 1, 2021, 16 pages.
Non-Final Office Action for U.S. Appl. No. 16/437,878, dated Dec. 15, 2021, 17 pages.
Final Office Action for U.S. Appl. No. 16/437,878, dated Mar. 31, 2022, 22 pages.
Final Office Action for U.S. Appl. No. 16/437,878, dated Jul. 21, 2022, 23 pages.
Non-Final Office Action for U.S. Appl. No. 16/437,878, dated Oct. 27, 2022, 21 pages.
Final Office Action for U.S. Appl. No. 16/542,923, dated Dec. 10, 2020, 16 pages.
Advisory Action and Examiner-Initiated Interview Summary for U.S. Appl. No. 16/542,923, dated Feb. 11, 2021, 4 pages.
Non-Final Office Action for U.S. Appl. No. 16/542,923, dated Apr. 1, 2021, 19 pages.
Notice of Allowance and Examiner-Initiated Interview Summary for U.S. Appl. No. 16/542,923, dated Mar. 17, 2023, 11 pages.
Notice of Allowance for U.S. Appl. No. 16/815,101, dated Feb. 13, 2023, 10 pages.
Non-Final Office Action for U.S. Appl. No. 17/081,522, dated Mar. 2, 2023, 11 pages.
Notice of Allowance for U.S. Appl. No. 16/906,129, dated Feb. 27, 2023, 10 pages.
Notice of Reason for Rejection for Japanese Patent Application No. 2021-560354, dated Mar. 10, 2023, 4 pages.
International Search Report and Written Opinion for International Patent Application No. PCT/US2023/061653, dated Apr. 6, 2023, 24 pages.
Notice of Allowance for U.S. Appl. No. 16/369,003, dated Mar. 30, 2023, 9 pages.
Advisory Action and Examiner-Initiated Interview Summary for U.S. Appl. No. 16/437,878, dated Apr. 14. 2023, 4 pages.
Advisory Action and Examiner-Initiated Interview Summary for U.S. Appl. No. 16/543,009, dated Mar. 28, 2023, 4 pages.
Non-Final Office Action for U.S. Appl. No. 16/437,878, dated May 31, 2023, 19 pages.
Notice of Allowance for U.S. Appl. No. 16/543,009, dated May 24, 2023, 10 pages.
Final Office Action for U.S. Appl. No. 17/081,522, dated Jun. 7, 2023, 11 pages.
Examination Report for European Patent Application No. 20718953.1, dated Jul. 6, 2023, 11 pages.
Final Office Action for U.S. Appl. No. 16/437,878, dated Sep. 19, 2023, 20 pages.
Non-Final Office Action for U.S. Appl. No. 17/081,522, dated Sep. 13, 2023, 13 pages.
Non-Final Office Action for U.S. Appl. No. 18/298,049, dated Oct. 5, 2023, 9 pages.
Author Unknown, "ARRI LogC4: Logarithmic Color Space," Specification, first published Jul. 7, 2021, ARRI AG, 20 pages.
Final Office Action for U.S. Appl. No. 16/542,923, dated Jul. 22, 2021, 19 pages.
Advisory Action for U.S. Appl. No. 16/542,923, dated Sep. 23, 2021, 3 pages.
Non-Final Office Action for U.S. Appl. No. 16/542,923, dated Nov. 12, 2021, 21 pages.
Final Office Action for U.S. Appl. No. 16/542,923, dated Mar. 2, 2022, 21 pages.

(56) References Cited

OTHER PUBLICATIONS

Advisory Action and Examiner-Initiated Interview Summary for U.S. Appl. No. 16/542,923, dated May 6, 2022, 4 pages.
Non-Final Office Action for U.S. Appl. No. 16/542,923, dated Jun. 22, 2022, 23 pages.
Final Office Action for U.S. Appl. No. 16/542,923, dated Oct. 7, 2022, 23 pages.
Final Office Action for U.S. Appl. No. 16/542,923, dated Nov. 14, 2022, 29 pages.
Advisory Action and Examiner-Initiated Interview Summary for U.S. Appl. No. 16/542,923, dated Dec. 15, 2022, 4 pages.
Non-Final Office Action for U.S. Appl. No. 16/543,009, dated Apr. 1, 2021, 14 pages.
Final Office Action for U.S. Appl. No. 16/543,009, dated Jul. 23, 2021, 15 pages.
Advisory Action for U.S. Appl. No. 16/543,009, dated Sep. 23, 2021, 3 pages.
Final Office Action for U.S. Appl. No. 16/543,009, dated Nov. 12, 2021, 15 pages.
Non-Final Office Action for U.S. Appl. No. 16/543,009, dated Mar. 4, 2022, 15 pages.
Final Office Action for U.S. Appl. No. 16/543,009, dated Jun. 10, 2022, 16 pages.
Non-Final Office Action for U.S. Appl. No. 16/543,009, dated Oct. 7, 2022, 16 pages.
Final Office Action for U.S. Appl. No. 16/543,009, dated Jan. 19, 2023, 19 pages.
Non-Final Office Action for U.S. Appl. No. 16/815,101, dated Nov. 12, 2021, 13 pages.
Final Office Action for U.S. Appl. No. 16/815,101, dated Mar. 2, 2022, 14 pages.
Advisory Action and Examiner-Initiated Interview Summary for U.S. Appl. No. 16/815,101, dated May 6, 2022, 4 pages.
Non-Final Office Action for U.S. Appl. No. 16/815,101, dated Jun. 22, 2022, 17 pages.
Final Office Action for U.S. Appl. No. 16/815,101, dated Oct. 7, 2022, 16 pages.
Advisory Action and Examiner-Initiated Interview Summary for U.S. Appl. No. 16/815,101, dated Dec. 20, 2022, 4 pages.
Ex Parte Quayle Action for U.S. Appl. No. 16/815,101, mailed Jan. 19, 2023, 7 pages.
Non-Final Office Action for U.S. Appl. No. 17/081,522, dated Jan. 20, 2022, 18 pages.
Final Office Action for U.S. Appl. No. 17/081,522, dated Apr. 28, 2022, 10 pages.
Advisory Action for U.S. Appl. No. 17/081,522, dated Jul. 5, 2022, 3 pages.
Non-Final Office Action for U.S. Appl. No. 17/081,522, dated Aug. 17, 2022, 9 pages.
Final Office Action for U.S. Appl. No. 17/081,522, dated Nov. 10, 2022, 10 pages.
Advisory Action and Examiner-Initiated Interview Summary for U.S. Appl. No. 17/081,522, dated Jan. 23, 2023, 4 pages.
Non-Final Office Action for U.S. Appl. No. 16/906,129, dated Jun. 9, 2022, 14 pages.
Final Office Action for U.S. Appl. No. 16/906,129, dated Dec. 12, 2022, 15 pages.
Notice of Reason for Rejection for Japanese Patent Application No. 2022-554701, dated Sep. 19, 2023, 11 pages.
Advisory Action for U.S. Appl. No. 16/437,878, dated Nov. 28, 2023, 3 pages.
Non-Final Office Action for U.S. Appl. No. 18/320,498, dated Dec. 6, 2023, 12 pages.
Non-Final Office Action for U.S. Appl. No. 16/437,878, dated Jan. 3, 2024, 20 pages.
Final Office Action for U.S. Appl. No. 17/081,522, dated Dec. 13, 2023, 15 pages.
First Office Action for Chinese Patent Application No. 2020800255413, dated Oct. 25, 2023, 19 pages.
Decision to Grant for Japanese Patent Application No. 2022-554701, mailed Feb. 20, 2024, 6 pages.
International Search Report and Written Opinion for International Patent Application No. PCT/US2023/079460, mailed Feb. 23, 2024, 16 pages.
Final Office Action for U.S. Appl. No. 16/437,878, mailed Apr. 5, 2024, 21 pages.
Final Office Action for U.S. Appl. No. 18/320,498, mailed Feb. 27, 2024, 14 pages.
Notice of Allowance for U.S. Appl. No. 17/081,522, mailed Apr. 5, 2024, 8 pages.
Notice of Allowance for U.S. Appl. No. 18/298,049, mailed Feb. 2, 2024, 9 pages.
Advisory Action and Examiner-Initiated Interview Summary for U.S. Appl. No. 17/081,522, mailed Feb. 16, 2024, 5 pages.
Notification to Grant for Chinese Patent Application No. 202080025541.3, mailed Mar. 20, 2024, 6 pages.
Notice of Preliminary Rejection for Korean Patent Application No. 10-2022-7034893, mailed Mar. 7, 2024, 17 pages.
Invitation to Pay Additional Fees and Partial Search for International Patent Application No. PCT/US2024/013657, mailed Apr. 15, 2024, 11 pages.
Written Decision on Registration for Korean Patent Application No. 10-2021-7035365, mailed Mar. 18, 2024, 7 pages.
Advisory Action and Examiner-Initiated Interview Summary for U.S. Appl. No. 18/320,498, mailed May 3, 2024, 4 pages.

* cited by examiner

LIGHT-EMITTING DIODES WITH MIXED CLOCK DOMAIN SIGNALING

FIELD OF THE DISCLOSURE

The present disclosure relates to mixed clock domain signaling and, more particularly, to mixed clock domain signaling for light-emitting diode (LED) packages arranged for cascade communication.

BACKGROUND

Light-emitting diodes (LEDs) are solid-state devices that convert electrical energy to light and generally include one or more active layers of semiconductor material (or an active region) arranged between oppositely doped n-type and p-type layers. When a bias is applied across the doped layers, holes and electrons are injected into the one or more active layers where they recombine to generate emissions such as visible light or ultraviolet emissions.

LEDs have been widely adopted in various illumination contexts, for backlighting of liquid crystal display (LCD) systems (e.g., as a substitute for cold cathode fluorescent lamps) and for direct-view LED displays. Applications utilizing LED arrays include vehicular headlamps, roadway illumination, light fixtures, and various indoor, outdoor, and specialty contexts. Desirable characteristics of LED devices include high luminous efficacy and long lifetime.

Large format multi-color direct-view LED displays (including full color LED video screens) typically include numerous individual LED panels, packages, and/or components providing image resolution determined by the distance between adjacent pixels or "pixel pitch." Direct-view LED displays typically include three-color displays with arrayed red, green, and blue (RGB) LEDs, and two-color displays with arrayed red and green (RG) LEDs. Other colors and combinations of colors may be used. For many LED display systems, it is desirable to form LED color groups for each pixel such as primary colors red, green, and blue (RGB) that define vertices of a triangle (or polygon) on a chromaticity diagram. This polygon defines the so-called color gamut of the display device, the area of which describes all the possible colors that the display device is capable of producing. Driver printed circuit boards for controlling LED displays are typically densely populated with electrical devices including capacitors, field effect transistors (FETs), decoders, microcontrollers, and the like for driving the pixels of the display. As pixel pitches continue to decrease for higher resolution displays, the density of such electrical devices scales higher corresponding to the increased number of pixels for a given panel area. This tends to add higher complexity and costs to LED panels for display applications.

The art continues to seek improved LED array devices with small pixel pitches while overcoming limitations associated with conventional devices and production methods.

SUMMARY

The present disclosure relates to mixed clock domain signaling and, more particularly, to mixed clock domain signaling for light-emitting diode (LED) packages arranged for cascade communication. Mixed clock domain signaling involves digital communication where time-positions of bit pulse edges in a communication channel are derived from multiple uncorrelated clock domains, including an original clock domain from a master controller and a local clock domain. In the context of LED displays, serial strings of LED packages are arranged as LED pixels to receive cascade communication signals, and the original clock domain is derived from a master controller and a local clock domain is derived at each LED package. By providing for the bit period to be maintained and correlated to the original clock domain throughout the repeated cascade communication, problems associated with multiple uncorrelated clock domains in the communication channel, such as sampling jitter, may be averted, thus avoiding loss of data integrity.

In one aspect, a method of digital communication comprises: transmitting digital communication from at least one LED package to at least one other element, the digital communication comprising a bit pattern that includes a plurality of pulse edges; and deriving a plurality of time-positions for the plurality of pulse edges from multiple uncorrelated clock domains. In certain embodiments: the bit pattern is divided into a bit start segment that defines a beginning of a bit and a data segment that defines data represented by the bit pattern; the multiple uncorrelated clock domains comprise a first clock domain correlated to the bit start segment and a second clock domain correlated to the data segment; and the second clock domain is controlled by synchronized logic operating in the second clock domain that is uncorrelated to the first clock domain. In certain embodiments, the bit start segment comprises a leading pulse edge of the plurality of pulse edges, and a first time-position of the plurality of time-positions defines the leading pulse edge. In certain embodiments, the first time-position of the plurality of time-positions is correlated to the first clock domain, and the first clock domain is correlated to a clock of a controller that precedes the LED package in the digital communication. In certain embodiments, the controller is a microcontroller or a field-programmable gate array (FPGA).

In certain embodiments: the data segment comprises an additional pulse edge of the plurality of pulse edges, and a second time-position of the plurality of time-positions defines the additional pulse edge; the additional pulse edge is correlated to the second clock domain; and the second clock domain is derived from circuitry of an active electrical element that resides within the LED package. In certain embodiments, the additional pulse edge is another leading pulse edge or a trailing pulse edge that follows the leading pulse edge of the bit start segment. In certain embodiments, the additional pulse edge is a trailing pulse edge that immediately follows the leading pulse edge of the bit start segment.

In certain embodiments: the LED package is one of a plurality of LED packages connected in cascade for the digital communication; the bit pattern is one of a plurality of bit patterns; the multiple uncorrelated clock domains comprise a master clock domain and a local clock domain for each LED package of the plurality of LED packages; and each bit pattern of the plurality of bit patterns comprises a bit start segment that is correlated to the master clock domain. In certain embodiments, each bit pattern of the plurality of bit patterns further comprises a data segment that is not correlated to the master clock domain. In certain embodiments: the local clock domain of each LED package of the plurality of LED packages is not correlated to the master clock domain; and each data segment is correlated to the local clock domain of at least one LED package of the plurality of LED packages. In certain embodiments, the plurality of LED packages are arranged as a plurality of LED pixels of an LED display.

In another aspect, an LED package comprises: at least one LED chip; at least one data input terminal configured to receive a digital communication signal in an original clock domain from a device that is external to the LED package; and at least one data output terminal, the at least one data output terminal configured to transmit the digital communication signal to another device that is external to the LED package such that the digital communication signal is routed from the at least one data input terminal to the at least one data output terminal through a path that is devoid of any element that synchronizes the digital communication signal to a local clock domain of the LED package. The LED package may further comprise a bit code assembler in the path between the at least one data input terminal and the at least one data output terminal, the bit code assembler being configured to receive the digital communication signal in the original clock domain and transmit the digital communication signal in a mixed clock domain that comprises portions of the digital communication signal in the original clock domain and other portions of the digital communication signal synchronized to the local clock domain, wherein the bit code assembler is configured to transmit the digital communication signal composed partially from the path that is devoid of any element that synchronizes the digital communication signal to the local clock domain and partially from other logic that is synchronized to the local clock domain.

In certain embodiments, the bit code assembler comprises at least one domain selection element configured to activate and deactivate conveyance of a portion of the digital communication signal in the original clock domain. In certain embodiments, the at least one domain selection element comprises a digital memory circuit configured to receive the digital communication signal at a clock input of the digital memory circuit, the received digital communication signal being at least partially in the original clock domain and initiating a first state of the digital memory circuit. In certain embodiments, the digital memory circuit is configured to be triggered to a second state by a reset control signal received by the digital memory circuit in the local clock domain. In certain embodiments, the digital memory circuit is configured to receive a second control signal indicating that the bit code assembler is ready to receive a next bit of the digital communication signal. In certain embodiments, the digital memory circuit comprises a flip-flop circuit, a data (D) flip-flop circuit, or a latch circuit.

In another aspect, a method of digital communication comprises: sending a digital communication signal in an original clock domain from a controller to at least LED package; and transmitting the digital communication signal in a mixed clock domain from the at least one LED package to another element, the mixed clock domain comprising a bit with a first pulse edge correlated to the original clock domain and a second pulse edge correlated to a local clock domain of the LED package. In certain embodiments, the first pulse edge is a leading pulse edge of a first pulse of the bit, and the first pulse edge defines a start of the bit. In certain embodiments, the second pulse edge is a trailing pulse edge of the first pulse. The method may further comprise a second pulse wherein a leading pulse edge of the second pulse and a trailing pulse edge of the second pulse are both correlated to the local clock domain. In certain embodiments: the at least one LED package is a first LED package of a plurality of LED packages connected for cascade communication; the local clock domain is a first local clock domain of the first LED package; and the other element is a second LED package of the plurality of LED packages. The method may further comprise transmitting the digital communication signal from the second LED package to another element such that the bit with the first pulse edge is correlated to the original clock domain and the second pulse edge is correlated to a second clock domain of the second LED package.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
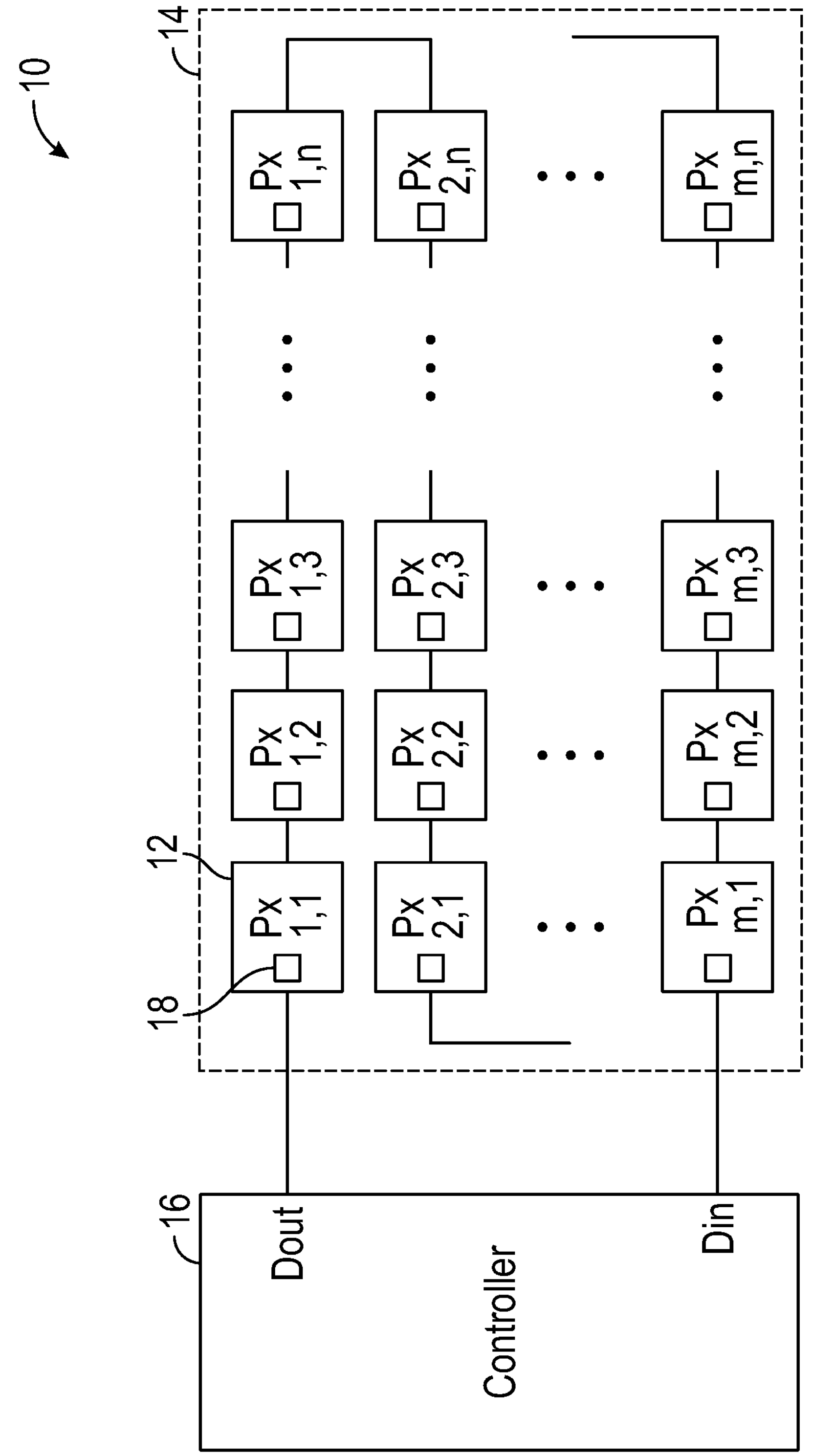
FIG. 1 is a block diagram schematic illustrating a system level control scheme for a lighting device using cascade communication for serially connected light-emitting diode (LED) packages.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to schematic illustrations of embodiments of the disclosure. As such, the actual dimensions of the layers and elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to illustrate the precise shape of a region of a device and are not intended to limit the scope of the disclosure. Additionally, sizes of structures or regions may be exaggerated relative to other structures or regions for illustrative purposes and, thus, are provided to illustrate the general structures of the present subject matter and may or may not be drawn to scale. Common elements between figures may be shown herein with common element numbers and may not be subsequently re-described.

The present disclosure relates to mixed clock domain signaling and, more particularly, to mixed clock domain signaling for light-emitting diode (LED) packages arranged for cascade communication. Mixed clock domain signaling involves digital communication where time-positions of bit pulse edges in a communication channel are derived from multiple uncorrelated clock domains, including an original clock domain from a master controller and a local clock domain. In the context of LED displays, serial strings of LED packages are arranged as LED pixels to receive cascade communication signals, and the original clock domain is derived from a master controller and the local clock domain is derived at each LED package. For embodiments where the original clock domain is derived from a master controller, the original clock domain may also be referred to as a master clock domain. By providing for the bit period to be maintained and correlated to the original clock domain throughout the repeated cascade communication, problems associated with multiple uncorrelated clock domains in the communication channel, such as sampling jitter, may be averted, thus avoiding loss of data integrity.

In cascade communication, multiple electronic devices are arranged as repeaters to successively receive serial communication for operation. In the context of fine-pitch video displays, multiple LED packages are serially arranged as LED pixels to receive cascade communication. Incoming signals to each LED pixel are produced by another element, such as a master controller or the previous LED pixel, and the bitstream of incoming signals is derived from clock domains of one or more preceding devices. Proper distribution of a common clock signal from the original clock domain to thousands of LED pixels creates challenges. Small sizes are required for LED packages to form pixels of high-resolution video displays and these size constraints may not permit additional resources such as a separate clock communication wire or conventional clock recovery hardware at each LED pixel. While the common clock signal can be encoded on a same line with other data, each receiver at each LED pixel would still need to have the resources to recover the common clock signal.

Instead of attempting to reproduce the original clock domain within each LED pixel, a local clock domain may be utilized. In this manner, a sampling technique may be implemented on the incoming bitstream at a higher frequency, which is derived from a local clock domain. It is known that a sampling technique generally refers to the sampling of incoming data of the bitstream at a higher frequency to decode a bit pattern of the incoming data. Sampling the incoming bitstream with a higher bit rate works well for communication between one transmitter and one receiver. However, when a relatively low number of repeaters are configured in cascade, sampling jitter poses significant challenges, particularly as more repeaters are added. As fine-pitch video displays may require hundreds or even thousands of components within a single cascade-repeater string, the limitations caused by sampling jitter become untenable. While each LED pixel can retransmit its local clock domain along the cascade communication line, sampling jitter limits the number of repeaters (e.g., LED pixels) that can be used before loss of data integrity. When sampling jitter is effectively amplified along a sufficient number of repeaters, neighboring bits can encroach on a time slot of an adjacent bit until the two bits cannot be discriminated and thus data are lost.

According to aspects of the present disclosure, problems of sampling jitter are reduced with mixed clock domain signaling by conveying a representation of the original clock domain from a master controller through the entire system of cascade repeaters while still maintaining the ability to use a sampling technique at each repeater in lieu of reproducing the original clock domain locally. This is accomplished by retransmitting a first part of the incoming signal that is correlated to the original clock domain as received and transcribing a second part of the signal containing data which may be changed within the LED pixel onto the output using the local clock domain. In this regard, this technique allows for the sampling technique to be used to decode the input and repeat or transcribe new data to the output of each LED pixel without propagating and amplifying the adverse effects of sampling jitter along the cascade communication line.

As used herein, the aforementioned representation of the original clock domain conveyed by each LED pixel may include differences relating to propagation delay, phase, and random jitter or noise. For simplicity, the representation of the original clock domain that is conveyed by each LED pixel may simply be referred to herein as the original clock domain.

As used herein, the terms “data stream” and “communication channel” may at times be used interchangeably. However, a “data stream” generally refers to a non-physical representation of data over time that flows through a set of at least one communication channel as well as the internal wiring and storage registers within various elements such as controllers and active electrical elements. A data stream may also be referred to as digital communication between two elements, such as a controller element that transmits digital communication and a receiver element that receives the digital communication. A “communication channel” generally refers to a physical medium through which the data stream is conveyed. For example, a communication channel may comprise a wire with associated electrical elements, an optical fiber, or even air as in the case of radio, light, or sound waves. A given physical channel could also be divided up in time or frequencies to allow multiple “communication channels” within one medium at once such as changing to a different frequency band. In certain aspects, communication channels may embody serial digital communication channels. Certain aspects relate to a binary communication channel that is a single wire referenced to a common conductor such as ground, which commonly can only hold one value at a time which is high or low voltage (e.g., digital “0” or “1”) and is controlled by the output register of the preceding device. Two-wire differential signaling methods are also contemplated, but the preferred embodiment shown here refers to the single-wire approach primarily because of the added complexity of providing more traces with fine pitch displays.

In certain aspects, the present disclosure relates to light-emitting devices including LEDs, LED packages, and related LED displays and, more particularly, to active control of LEDs within LED displays. LED displays may include rows and columns of LEDs that form an array of LED pixels. A particular LED pixel may include a cluster of LED chips of the same color or multiple colors, with an exemplary LED pixel including a red LED chip, a green LED chip, and a blue LED chip. In certain embodiments, an LED package includes a plurality of LED chips that form at least one LED pixel, and a plurality of such LED packages may be arranged to form an array of LED pixels for an LED display. Each LED package may include its own active electrical element that is configured to receive a control signal and actively maintain an operating state, such as brightness or grey level or a color select signal for the LED chips of the LED device while other LED devices are being addressed. In certain embodiments, the active electrical element may include active circuitry that includes one or more of a driver device, a signal conditioning or transformation device, a memory device, a decoder device, an electrostatic discharge (ESD) protection device, a thermal management device, and a detection device, among others. The active electrical element further includes circuitry to facilitate communication with multiple uncorrelated clock domains, including an original clock domain from a controller and a local clock domain derived within the active electrical element. In this regard, each LED pixel of an LED display may be configured for operation with active matrix addressing with mixed clock domain communication. The active electrical element may be configured to receive one or more of an analog control signal, an encoded analog control signal, a digital control signal, and an encoded digital control signal. In such arrangements, strings of LED packages, each with their own active electrical element, may be arranged for serial communication where each active electrical element receives data from a data stream and transmits data to the next active electrical element in the string of LED packages.

For active matrix addressing, each LED pixel is configured to actively maintain an operating state or otherwise control the driving state, such as brightness or grey level or color select, while other LED pixels are being addressed, thereby allowing each LED pixel to maintain or otherwise independently control their driving state and provide improved viewing and/or image recording by reducing or eliminating effects caused by lower-frequency pulsing beating with aforementioned equipment (e.g., lighting sources, other pulsed displays, or image capture equipment). Accordingly, each LED pixel may be configured to hold its respective operating state with a continuous drive signal, inclusive of pulse-width modulation (PWM), rather than by conventional methods using time division multiplexed signals scanning among groups of pixels and often result in the addition of low frequency components to the drive signals associated with passive matrix addressing. In this regard, each LED pixel may include an active electrical chip or an active electrical element that may include a memory device and the ability to alter a driving condition of the LED pixel based on a state stored in the memory of the active electrical element. In certain embodiments, the continuous drive signal is a constant analog drive current, and in other embodiments where the brightness level may be controlled by pulsed methods such as PWM, the continuous drive signal may refer to a PWM signal that is not interrupted by the time division multiplexed scanning of other LED pixels within the array or within a sub-array. In certain embodiments, the active electrical element may include active circuitry that includes one or more of a driver device, a signal conditioning or transformation device, a memory device, a decoder device, an ESD protection device, a thermal management device, a detection device, and a voltage and/or current sensing device, a command processing device, and circuitry, among others. In various embodiments, an active electrical element comprises an integrated circuit chip, an application-specific integrated circuit (ASIC), a microcontroller, or a field-programmable gate array (FPGA). In certain embodiments, active electrical elements may be configured to be programmable or reprogrammable after they are manufactured through various memory elements and logic that are incorporated within the active electrical elements.

As used herein, the terms “active electrical chip,” “active electrical element,” or “active electrical component” includes any chip or component that is able to alter a driving condition of an LED based on memory or other information that may be stored within a chip or component. As used herein, the terms “active LED pixel” and “smart LED pixel” may be used interchangeably and may refer to a device that includes one or more LED devices or chips that form a pixel and an active electrical element or chip as described above. In certain embodiments, each LED pixel may comprise a single LED package that is configured as an active LED package that includes multiple LED chips and an active electrical element as described above. In this manner, the number of separate electrical devices needed for the LED display may be reduced, such as the separate electrical devices located on the backsides of LED panels of the LED display as previously described. Additionally, overall operating powers needed for operation of the LED panels may be reduced.

FIG. 1 is a block diagram schematic 10 illustrating a system level control scheme for a lighting device using cascade communication for serially connected LED packages 12. The lighting device may embody an LED display and each LED package 12 may form an LED pixel of the display. For such applications, the terms LED package and LED pixel may be used interchangeably, although it is recognized that an LED package may be composed of several LED pixels formed together in one component. An exemplary LED string 14 arranged for serial communication is indicated by a dashed box in FIG. 1. While only the single LED string 14 is provided in detail, one or more other LED strings may also be coupled with a controller 16. As illustrated, the controller 16 is arranged to control one or more LED strings 14. The controller 16 may comprise an integrated circuit, such as one or more of an ASIC, a microcontroller, a programmable control element, and an FPGA. In certain embodiments, the controller 16 may be referred to as a master controller for the LED string 14. In other embodiments, the controller 16 may be a sub-controller to which another master controller (not shown) delegates a set of tasks as it pertains to larger system. A data signal out (DOUT) of the controller 16 may be passed along the LED string 14 in a serial manner and a return data signal in (DIN) may be received back by the controller 16. The signal includes an original clock domain provided by the controller 16 or another master controller as described above. In FIG. 1, each LED package 12, or LED pixel, is provided with a label such as “Px 1,1” where the first number represents a row, and the second number represents a column. Each LED package 12 includes its own active electrical element 18 that is registered and housed therewithin so that each LED package 12 comprises logic for responding to received data signals.

Figure 2:
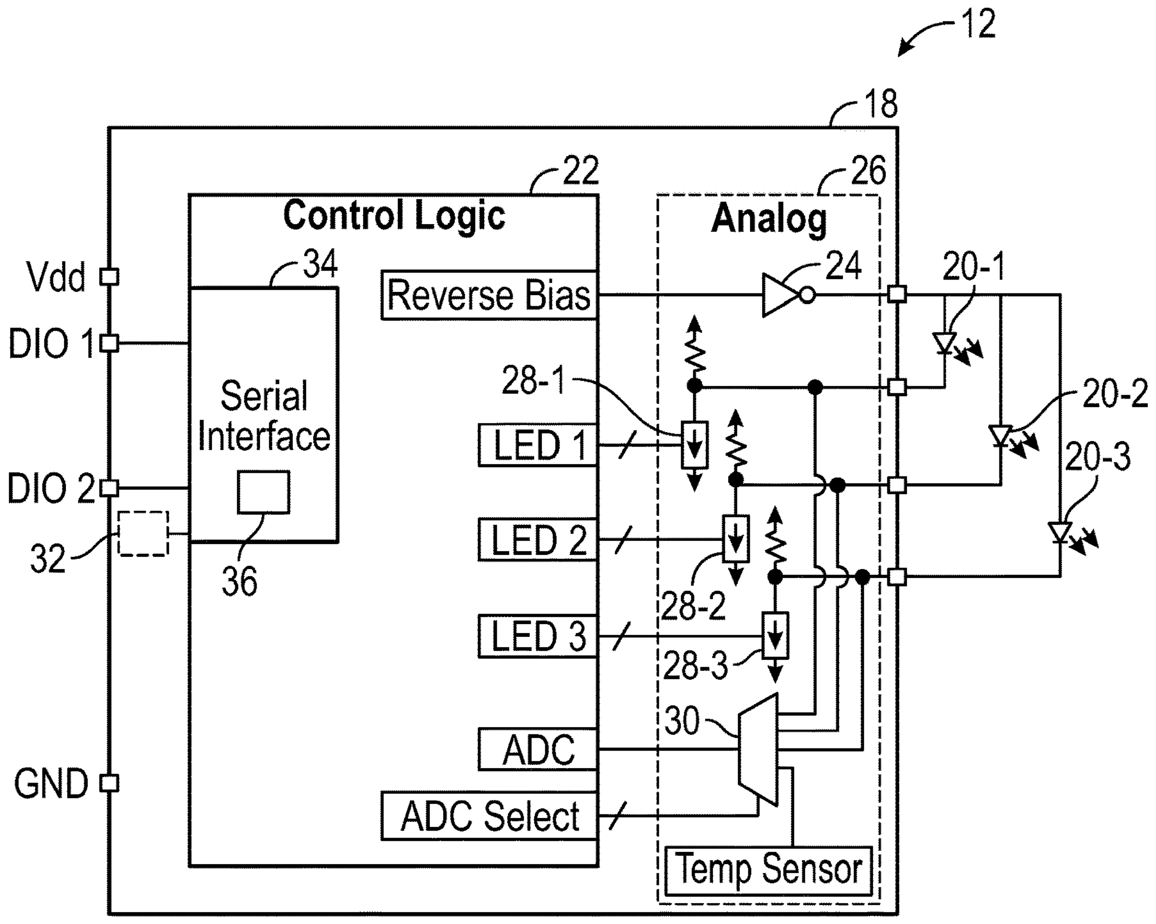
FIG. 2 is a schematic block diagram of an LED package from FIG. 1 with certain details of an active electrical element according to principles of the present disclosure.

FIG. 2 is a schematic block diagram of an LED package 12 from FIG. 1 with certain details of the active electrical element 18 according to principles of the present disclosure. The active electrical element 18 may include multiple ports represented by a supply voltage (Vdd), ground (GND or Vss), and bidirectional communication ports or digital input/output ports (DIO1 and DIO2) according to embodiments disclosed herein. By having the DIO1 and DIO2 ports as bidirectional communication ports, the active electrical element 18 may advantageously be able to detect an input signal from a communication channel and then assign one of the DIO1 and DIO2 ports as an input port and the other of the DIO1 and DIO2 ports as the output port. This provides flexibility in layouts for displays where a plurality of LED packages 12 are connected together for cascade communication. For example, multiple LED packages 12 may be arranged in multiple rows where data cascades from package-to-package along each row and in a serpentine manner from row-to-row as illustrated in FIG. 1. In such arrangements, the bidirectional communication ports allow the LED packages 12 to be mounted in a same orientation and receive and transmit digital communication left-to-right or right-to-left depending on the row position. In addition to the four ports of Vdd, GND, DIO1, and DIO2 on the left side of the block diagram, the active electrical element 18 includes four ports on the right side that are coupled with LEDs 20-1 to 20-3 of the LED package 12. In this regard, the LEDs 20-1 to 20-3 are packaged together with the active electrical element 18 in the common LED package 12 to form an individual pixel of a larger display. As used herein, the LEDs 20-1 to 20-3 may also be referred to as LED chips.

Certain elements of the active electrical element 18 are described below; however, it is understood that the active electrical element 18 may include many other components, including memory elements, signal conditioning elements, thermal management, electrostatic discharge elements, clock elements, and oscillators, among others. In FIG. 2, control logic 22 is arranged to receive input data, execute commands according to a command protocol, provide control signals for operation of the LEDs 20-1 to 20-3, report various voltage levels and/or temperature levels included with output data, and transmit the output data via the DIO1 and DIO2 ports to the next adjacent LED package. The control logic 22 may operate in the digital domain and may include input/output buffers electrically coupled to the DIO1 and DIO2 ports that assign input and output configurations for the bidirectional DIO1 and DIO2 ports.

In certain embodiments, the active electrical element 18 may be configured to provide both forward and reverse bias states to the LEDs 20-1 to 20-3. In this regard, the control logic 22 may include a reverse bias control output signal that, with appropriate active elements, is configured to supply either near-Vdd or near-GND voltage levels to the LEDs 20-1 to 20-3. Since the nomenclature “reverse bias” implies that a high level on the control logic 22 output produces a reverse bias condition, the output signal could simply be coupled with an inverter 24 that is provided in a driver 26 of the active electrical element 18. As such, the LEDs 20-1 to 20-3 may be either forward biased or reverse biased depending on a particular operating state and/or command received by the control logic 22. The inverter 26, or inverter logic element, may have sufficient output characteristics to drive the LEDs 20-1 to 20-3. The driver 26 may be substantially an analog interface of the active electrical element 18 that is electrically coupled with the control logic 22. The driver 26 may include controllable current sources 28-1 to 28-3 which could also be configured as LED sink drivers. Pull-up resistors R1 to R3 may be incorporated to provide paths to Vdd for each of the LEDs 20-1 to 20-3 which aid with the voltage measurement when configured for reverse bias. Each of the current sources 28-1 to 28-3 may be electrically coupled with digital output signals LED1 to LED3 of the control logic 22. The output signals LED1 to LED3 may be provided along multiple wires that are coupled to each of the current sources 28-1 to 28-3 for current selection purposes. The output signals LED1 to LED3 may embody PWM outputs of the control logic 22 for controlling operation of the LEDs 20-1 to 20-3. The driver 26 may also include a multiplexer 30 electrically coupled with an analog-to-digital (ADC) converter and ADC selector of the control logic 22. Additionally, the driver 26 may include an on-chip temperature sensor that is provided through the multiplexer 30. In certain embodiments, the temperature sensor provides thermal compensation for the LEDs 20-1 to 20-3 via a thermal compensation curve and/or thermal shut down.

The active electrical element 18 also includes local clock circuitry 32 that produces a local clock domain for the active electrical element 18 and LED package 12. In certain embodiments, the local clock circuitry 32 may comprise an oscillator. In order to provide multiple uncorrelated clock domains in an output signal, part of the output signal is provided by logic synchronized to the original clock domain and another part of the output signal is provided by logic synchronized to the local clock domain. As described above, the original clock domain refers to the overall clock domain received from a device external to the LED package 12. For example, the external device may embody a master controller such as the controller 16 of FIG. 1 or a master controller that is coupled to the controller 16 of FIG. 1. In this regard, the data stream initially received by the DIO1 or DIO2 port is in the original clock domain, unless the data stream has already passed through another LED package. When the data stream has passed through another LED package before reaching the LED package 12 of FIG. 2, the data stream may already be provided in a mixed clock domain derived from the local clock domain of the previous LED package and the original clock domain. In such cases, the data stream that is transmitted from the LED package 12 is provided in a mixed clock domain that includes the original clock domain and the local clock domain of the LED package 12. In this manner, each LED package in a cascade communication arrangement may receive and transmit digital communication that retains a segment derived from the original clock domain, and each individual LED package may transmit another segment that is synchronized with the local clock domain of that individual LED package. Accordingly, output signals from each LED package 12 is of a mixed clock domain having part of the signal correlated to the original clock domain and another part correlated to the local clock domain which is produced by the local clock circuitry 32 of that individual LED package 12.

The active electrical element 18 further comprises a serial interface 34 that embodies a module with circuitry configured to decode and convert the incoming signal of the data stream into a bitstream in the local clock domain, which can be further processed by the control logic 22. The serial interface 34 is further configured to retransmit the decoded and converted bitstream along with modified data to the communication channel to which another LED package or another external element is connected in a manner that is compatible with the overall LED display system. In certain embodiments, the serial interface may include circuitry in the form of a bit code assembler 36 that assembles pulse elements produced from multiple uncorrelated clock domains.

Figure 3:
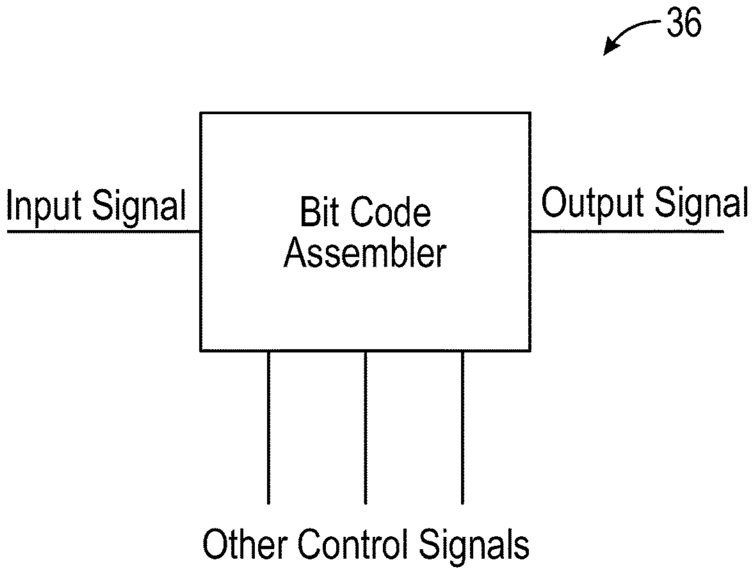
FIG. 3 is a general schematic illustrating various inputs and outputs of a bit code assembler of FIG. 2.

FIG. 3 is a general schematic illustrating various inputs and outputs of the bit code assembler 36 of FIG. 2. As described above, the input signal may be received from a communication channel in an original clock domain provided by a master controller. The input signal may be received at one of the DIO1 and DIO2 ports and the output signal may be transmitted at the other of the DIO1 and DIO2 ports of FIG. 2. The input signal is routed to the bit code assembler 36, and the output signal is derived in a mixed clock domain that includes a bit pattern that includes at least one pulse edge correlated to the original clock domain of the input signal and at least one other pulse edge that is in the local clock domain, which is uncorrelated to the original clock domain. As used herein, a mixed clock domain refers to communication where time-positions of pulse edges of a bit pattern in a communication channel are derived from multiple uncorrelated clock domains, such as the original clock domain from the controller 16 of FIG. 1 and the local clock domain from the local clock circuitry 32 within the active electrical element 18 of each LED package 12 as illustrated by FIG. 2. Pulse edges of the bit pattern may refer to various leading or trailing pulse edges, positive (e.g., increasing) edges, or negative (e.g., decreasing) edges. Other control signals for the bit code assembler 36 may include one or more of a ready signal, an acknowledge bit start signal, and a data pulse signal, among others. These and other embodiments are further described below.

Figure 4:
FIG. 4 is a generalized block diagram of a data signal with a bit pattern that may be provided as digital communication for the input or output signal of FIG. 3.

FIG. 4 is a generalized block diagram of a data signal with a bit pattern 38 that may be provided as digital communication for the output signal of FIG. 3. The bit pattern 38 may include a bit start segment and a bit data segment. In certain embodiments, the bit start segment retains or is otherwise correlated to the original clock domain of the input signal while the bit data segment is derived in a local clock domain, which is uncorrelated from the original clock domain. In this regard, the bit data segment may be derived from the local clock domain that is completely unrelated to the original clock domain. For the bit start segment to retain or be correlated to the original clock domain, the bit start segment is conveyed from the input signal to the output signal without registration. It is understood that buffering and noise may occur such that the output of the bit start segment is altered in phase while still being correlated with the original clock domain.

Figure 5A:
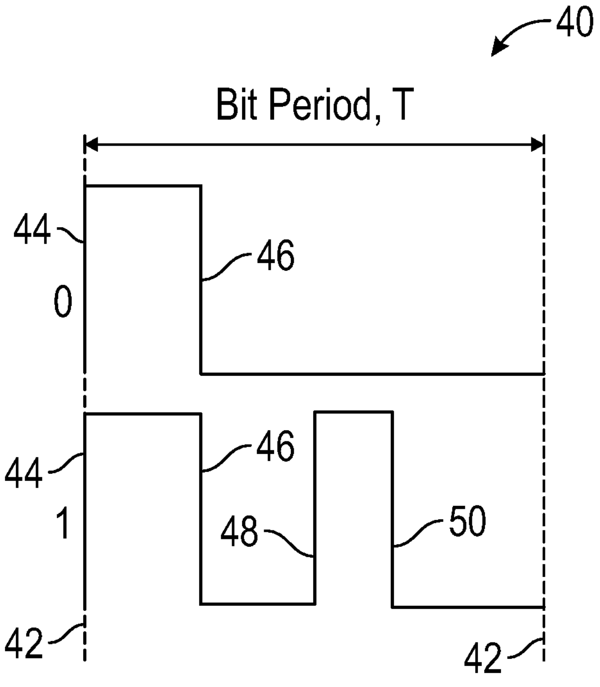
FIG. 5A is an illustration representing a bit period for an input or output data signal from the bit code assembler of FIG. 3.

FIG. 5A is an illustration representing a bit period 40 for an output data signal from the bit code assembler 36 of FIG. 3. FIG. 5A represents bit periods for exemplary data of either a “0” value or a “1” value. A bit start 42 is illustrated as two vertical dashed lines that define the bit period. A time-position of a leading pulse edge 44 of the bit start pulse is in the original clock domain as described above for the bit start segment of FIG. 4. The remainder of the bit period is in the local clock domain as described above for the bit data segment of FIG. 4. In this manner, a time-position of a trailing pulse edge 46 of the bit start pulse is in the local clock domain. If there is not a second leading pulse edge for another pulse, the bit is a “0.” If there is a second leading pulse edge 48 of a second pulse, the bit is a “1.” For the “1” bit, the second leading pulse edge 48 and corresponding trailing pulse edge 50 are in the local clock domain.

Figure 5B:
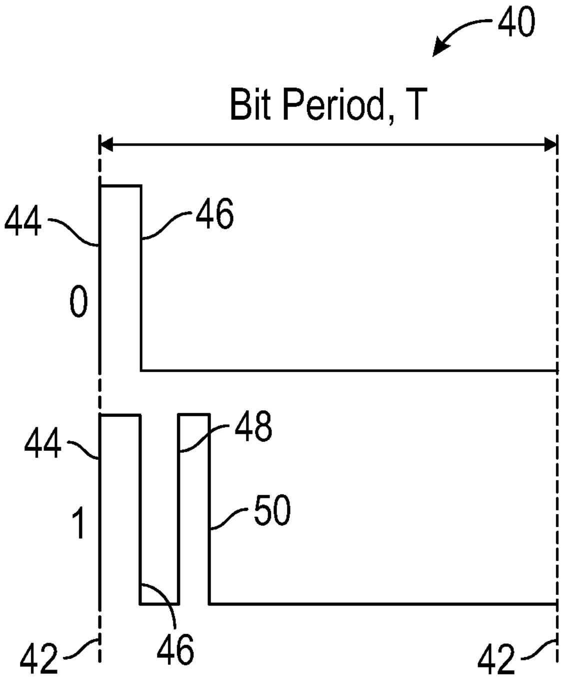
FIG. 5B is an illustration representing a bit period for an input or output data signal from the bit code assembler of FIG. 3 for embodiments where a preceding component clock is of a higher frequency.
Figure 6:
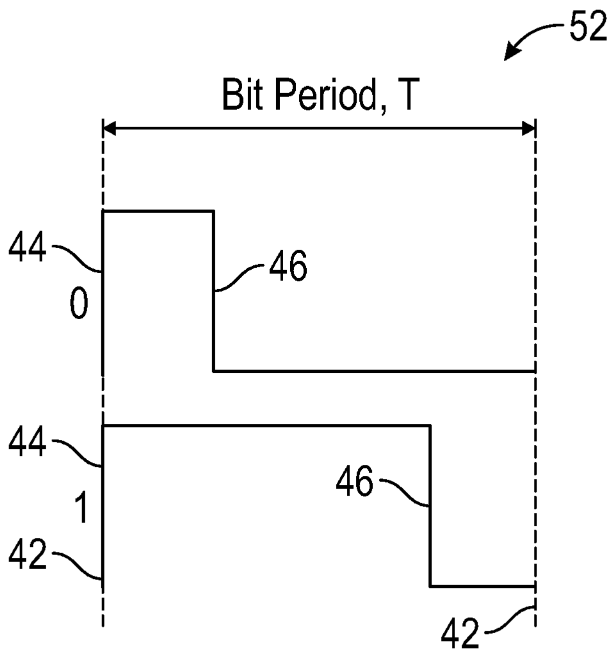
FIG. 6 is an illustration representing a bit period for an alternative implementation for the bit code assembler of FIG. 3 where data is discriminated by bit widths.

FIG. 5B is an illustration representing a bit period 44 for an input or output data signal from the bit code assembler of FIG. 3 for embodiments where a local clock is of a higher frequency. To transmit a “1,” the pulses may be sent as fast as possible without changing the bit period. This two-pulse method may be advantageous in certain embodiments, as a counter may be used with the input signal used as the clock and no sampling is required for the decoding of the bit value. In extreme cases where the preceding local clock is at a very high frequency and the receiving local clock is at a low frequency, both pulses may be received within a single clock cycle and still be decoded properly. For both FIGS. 5A and 5B, a time-position of the leading pulse edge 44 of the bit start pulse is in the original clock domain, thereby setting the bit period from the master controller. In this regard, time-positions of the trailing pulse edge 46 and the pulse edges 48, 50 of additional pulses are in the local clock domain and the jitter in their position do not contribute to the jitter of the bit period. FIG. 6 is an illustration representing a bit period 52 for an alternative implementation for the bit code assembler 36 of FIG. 3 where data are discriminated by bit widths. For example, a smaller bit width indicates a "0" while a larger bit width indicates a "1." Accordingly, the time-position of the leading pulse edge 44 of the bit start 42 in the output signal remains in the original clock domain while the time-position of the trailing pulse edge 46 is controlled by logic in the local clock domain.

Figure 7A:
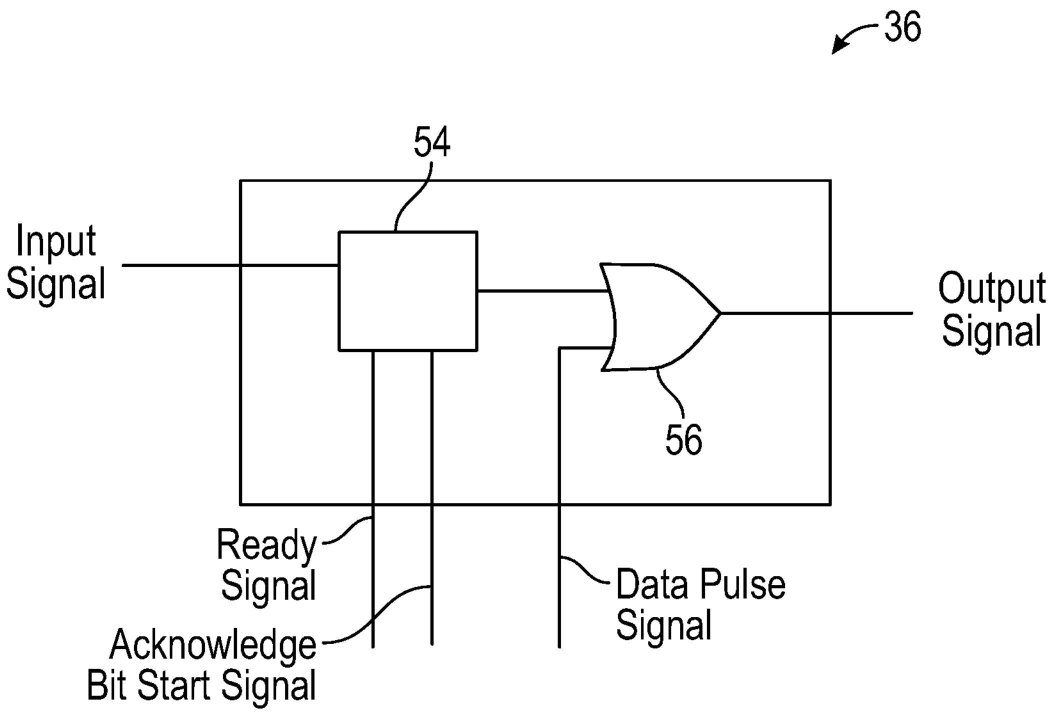
FIG. 7A is a general schematic view of a configuration of the bit code assembler of FIGS. 2 and 3 where the bit code assembler includes a domain selection element and a digital logic gate.
Figure 7B:
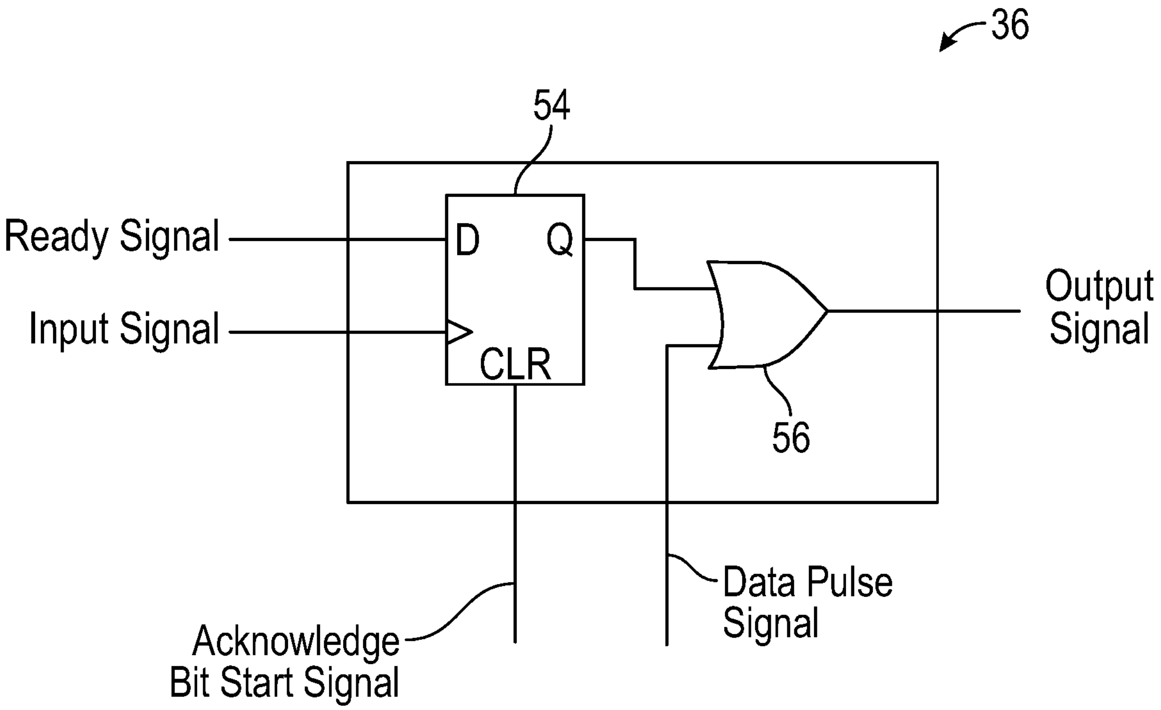
FIG. 7B is a general schematic view of a configuration of the bit code assembler of FIGS. 2 and 3 that is similar to FIG. 7A and includes further details of the domain selection element.

FIGS. 7A and 7B are general schematic views of the bit code assembler 36 of FIGS. 2 and 3 where the bit code assembler 36 includes a domain selection element 54 and a digital logic gate 56. FIG. 7A is a more generalized embodiment and FIG. 7B illustrates additional details within the domain selection element 54. FIGS. 7A and 7B describe configurations of the bit code assembler 36 that may produce the bit periods as described above for FIGS. 5A, 5B, and 6.

As illustrated, the acknowledge bit start signal may refer to acknowledgement or a reset control signal from the control logic (e.g., 22 of FIG. 2) in the local clock domain that the decoder recognizes that a particular bit has started (with logic in the local clock domain), and by providing the acknowledge bit start signal, the bit code assembler 36 concludes the bit start signal, which may in some embodiments produce a trailing pulse edge. In such an example, a leading edge of a bit start pulse in the output signal remains derived from the original clock domain of the input signal while a trailing edge of the output bit start pulse, or any other pulse edges, may be derived from the local clock domain provided by the data pulse signal and/or the acknowledge bit start signal. To provide for part of the output signal to be correlated with the original clock domain, digital communication is routed from the input signal to the output signal relative to the bit code assembler 36 and the entire LED package 12 of FIG. 2 through a path that is devoid of any element that synchronizes the signal from the original clock domain to the local clock domain.

In certain embodiments, the domain selection element 54 is a digital memory circuit, such as a flip-flop or a latch element, that receives and holds a single state at a time (e.g., a "0" state or a "1" state) at a clock input of the digital memory circuit. The single input bit may be held by the domain selection element 54 long enough to be sampled and decoded by the active electrical element of the local LED package. The domain selection element 54 may be asynchronously reset when the acknowledge bit start signal or reset control signal is received. In certain embodiments, the digital logic gate 56 is an OR gate with two inputs and a single output where a "1" is transmitted if either or both of the inputs is high ("1") and a "0" is transmitted if both of the inputs are low ("0"). The input signal is at least partially derived from the original clock domain and is received by the bit code assembler 36. The input signal, the ready signal, and the acknowledge bit start signal are received by the domain selection element 54. The acknowledge bit start signal is in the local clock domain and acknowledges the bit start segment. Accordingly, the next pulse edge of the bit period and bit data segment is produced by logic synchronized in the local clock domain. When the data segment has been transmitted, the ready signal will indicate that the bit code assembler 36 is ready to receive a next bit data segment. The data pulse signal is received by the digital logic gate 56 in the local clock domain. In this manner, the output signal from the digital logic gate 56 includes portions of both original and local clock domains, which are uncorrelated from one another. Stated differently, the bit code assembler 36 and the serial interface 34 of FIG. 2 provide a direct path between a data input terminal (e.g., one of DIO1 or DIO2) and a data output terminal (e.g., the other of DIO1 or DIO2) for a communication data signal within a specific time period controlled by the ready signal, and the direct path is devoid of any elements that synchronize the input signal to the local clock domain. Accordingly, the bit code assembler 36 is configured to activate and deactivate conveyance of a portion of the digital communication signal in the original clock domain.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of digital communication, the method comprising:

transmitting digital communication from at least one light-emitting diode (LED) package to at least one other element, the digital communication comprising a bit pattern that includes a plurality of pulse edges; and deriving a plurality of time-positions for the plurality of pulse edges from multiple uncorrelated clock domains.

2. The method of claim 1, wherein:

the bit pattern is divided into a bit start segment that defines a beginning of a bit and a data segment that defines data represented by the bit pattern;

the multiple uncorrelated clock domains comprise a first clock domain correlated to the bit start segment and a second clock domain correlated to the data segment; and the second clock domain is controlled by synchronized logic operating in the second clock domain that is uncorrelated to the first clock domain.

3. The method of claim 2, wherein the bit start segment comprises a leading pulse edge of the plurality of pulse edges, and a first time-position of the plurality of time-positions defines the leading pulse edge.

4. The method of claim 3, wherein the first time-position of the plurality of time-positions is correlated to the first clock domain, and the first clock domain is correlated to a clock of a controller that precedes the LED package in the digital communication.

5. The method of claim 4, wherein the controller is a microcontroller or a field-programmable gate array (FPGA).

6. The method of claim 4, wherein:

the data segment comprises an additional pulse edge of the plurality of pulse edges, and a second time-position of the plurality of time-positions defines the additional pulse edge;

the additional pulse edge is correlated to the second clock domain; and the second clock domain is derived from circuitry of an active electrical element that resides within the LED package.

7. The method of claim 6, wherein the additional pulse edge is another leading pulse edge or a trailing pulse edge that follows the leading pulse edge of the bit start segment.

8. The method of claim 6, wherein the additional pulse edge is a trailing pulse edge that immediately follows the leading pulse edge of the bit start segment.

9. The method of claim 1, wherein:

the LED package is one of a plurality of LED packages connected in cascade for the digital communication;

the bit pattern is one of a plurality of bit patterns;

the multiple uncorrelated clock domains comprise a master clock domain and a local clock domain for each LED package of the plurality of LED packages; and each bit pattern of the plurality of bit patterns comprises a bit start segment that is correlated to the master clock domain.

10. The method of claim 9, wherein each bit pattern of the plurality of bit patterns further comprises a data segment that is not correlated to the master clock domain.

11. The method of claim 10, wherein:

the local clock domain of each LED package of the plurality of LED packages is not correlated to the master clock domain; and each data segment is correlated to the local clock domain of at least one LED package of the plurality of LED packages.

12. The method of claim 11, wherein the plurality of LED packages are arranged as a plurality of LED pixels of an LED display.

13. A light-emitting diode (LED) package comprising:

at least one LED chip;

at least one data input terminal configured to receive an input digital communication signal at least partially in an original clock domain from a device that is external to the LED package; and at least one data output terminal, the at least one data output terminal configured to transmit an output digital communication signal to another device that is external to the LED package, wherein the output digital communication signal is in a mixed clock domain that comprises portions of the output digital communication signal in the original clock domain and other portions of the output digital communication signal synchronized to a local clock domain, wherein the local clock domain is uncorrelated with the original clock domain.

14. The LED package of claim 13, further comprising a bit code assembler in a path between the at least one data input terminal and the at least one data output terminal, the bit code assembler being configured to receive the input digital communication signal at least partially in the original clock domain and transmit the output digital communication signal in the mixed clock domain.

15. The LED package of claim 14, wherein the bit code assembler comprises at least one domain selection element configured to activate and deactivate conveyance of a portion of the output digital communication signal in the original clock domain.

16. The LED package of claim 15, wherein the at least one domain selection element comprises a digital memory circuit configured to receive the input digital communication signal at a clock input of the digital memory circuit, the received input digital communication signal being at least partially in the original clock domain and initiating a first state of the digital memory circuit.

17. The LED package of claim 16, wherein the digital memory circuit is configured to be triggered to a second state by a reset control signal received by the digital memory circuit in the local clock domain.

18. The LED package of claim 16, wherein the digital memory circuit is configured to receive a second control signal indicating that the bit code assembler is ready to receive a next bit of the input digital communication signal.

19. The LED package of claim 16, wherein the digital memory circuit comprises a flip-flop circuit, a data (D) flip-flop circuit, or a latch circuit.

20. A method of digital communication, the method comprising:

sending a digital communication signal at least partially in an original clock domain from a controller to at least one light-emitting diode (LED) package; and transmitting an output digital communication signal in a mixed clock domain from the at least one LED package to another element, the mixed clock domain comprising a bit with a first pulse edge correlated to the original clock domain and a second pulse edge correlated to a local clock domain of the LED package, wherein the local clock domain is uncorrelated from the original clock domain.

21. The method of claim 20, wherein the first pulse edge is a leading pulse edge of a first pulse of the bit, and the first pulse edge defines a start of the bit.

22. The method of claim 21, wherein the second pulse edge is a trailing pulse edge of the first pulse.

23. The method of claim 22, further comprising a second pulse wherein a leading pulse edge of the second pulse and a trailing pulse edge of the second pulse are both correlated to the local clock domain.

24. The method of claim 20, wherein:

the at least one LED package is a first LED package of a plurality of LED packages connected for cascade communication;

the local clock domain is a first local clock domain of the first LED package; and the other element is a second LED package of the plurality of LED packages.

25. The method of claim 24, further comprising:

transmitting the output digital communication signal from the second LED package to another element such that the bit with the first pulse edge is correlated to the original clock domain and the second pulse edge is correlated to a second clock domain of the second LED package.

* * * * *